United States Patent [19]

Williams

[11] 4,434,649
[45] Mar. 6, 1984

[54] GAUGE HAVING A SURFACE FOLLOWER WITH PERIPHERAL VENT

[75] Inventor: Paul Williams, Columbus, Ohio

[73] Assignee: AccuRay Corporation, Columbus, Ohio

[21] Appl. No.: 255,424

[22] Filed: Apr. 20, 1981

[51] Int. Cl.³ .................... G01B 13/06; G01B 13/04
[52] U.S. Cl. ................................ 73/37.7; 324/229
[58] Field of Search ............ 73/37.7, 37.6; 324/229, 324/230, 231, 225

[56] References Cited

U.S. PATENT DOCUMENTS

| | | | |
|---|---|---|---|
| 1,946,924 | 2/1934 | Allen et al. | 33/125 |
| 3,321,838 | 5/1967 | Albertson, Jr. | 33/174 |
| 3,495,442 | 2/1970 | Rejsa | 73/37.6 |
| 3,528,002 | 9/1970 | Dunlavey | 33/143 L |
| 3,648,587 | 3/1972 | Stevens | 73/37.7 |
| 3,855,524 | 12/1974 | Crawford | 324/34 TK |
| 3,948,082 | 4/1976 | Zumbach et al. | 324/230 X |
| 4,107,606 | 8/1978 | Typpo et al. | 324/229 |

FOREIGN PATENT DOCUMENTS

| | | | |
|---|---|---|---|
| 52-38244 | 3/1977 | Japan | 73/37.5 |
| 839996 | 6/1960 | United Kingdom | 73/37.5 |
| 589545 | 1/1978 | U.S.S.R. | 73/37 |

Primary Examiner—Gerald Goldberg
Assistant Examiner—Thomas P. Noland
Attorney, Agent, or Firm—C. Henry Peterson

[57] ABSTRACT

An apparatus such as a caliper gauge can be utilized in performing a measurement, such as a thickness measurement, of a traveling sheet or the like. The apparatus comprises a surface follower body (18, 72, 74) adapted to be constrained during the measurement for movement along a surface follower path intersecting the path of the sheet (10, 80) and urged by a force toward one surface of the sheet. The body has a gas confining wall (32a, 90, 104) bounded by a uniformly distributed pressurized gas supply aperture or apertures (46, 92, 106) for pressurizing a gas bearing region (48, 108, 110) contiguous to the sheet surface with sufficient pressure against the sheet and the wall to levitate the body against the urging force. The pressurization is effected without producing substantial amounts of high velocity gas flow over the surface of the sheet within the gas bearing region. The body is maintained at a distance from the sheet surface that is substantially constant and relatively unaffected by variations in the roughness of the surface.

20 Claims, 11 Drawing Figures

GAUGE HAVING A SURFACE FOLLOWER WITH PERIPHERAL VENT

CROSS REFERENCE TO RELATED APPLICATIONS

Various features of apparatus disclosed for completness of description but not claimed herein are claimed in the copending applications Ser. No. 06/315,173 filed Oct. 26, 1981 by Dan R. Landis and Paul Williams for "Measuring System Improvements" and Ser. No. 06/315,200 filed Oct. 26, 1981 by Thomas M. Domin, Dan R. Landis and Paul Williams for "Sheet Measuring Apparatus."

TECHNICAL FIELD

This invention relates to apparatus for maintaining a surface follower body at a substantially constant distance from a surface that is movable in space, by forming a gas bearing region contiguous to the body and the surface. More particularly the invention relates to such apparatus wherein the gas bearing is formed without producing substantial amounts of high velocity gas flow over the surface within the gas bearing region, whereby the distance between the body and the surface is relatively unaffected by variations in the roughness of the surface.

While there are a number of uses for such apparatus, the invention is herein described and illustrated in a caliper gauge embodiment for measuring the thickness of paper, plastic, rubber and the like, particularly paper in the form of a traveling sheet. Such a gauge in accordance with this invention can provide thickness measurements that are markedly independent of line speed or sheet velocity, and admits of practical calibration with static samples.

BACKGROUND ART

Surface followers and measuring apparatus of the general type to which this invention relates are described in the U.S. Pat. Nos. 1,946,924, Allen; 3,321,838, Albertson; 3,495,442, Rejsa; 3,528,002, Dunlavey; 3,855,524, Crawford, and 4,107,606, Typpo. Other background disclosures are contained in British Patent Specification No. 839,996 (1960); USSR Inventors' Certificate No. 589,545 (1978) and Japanese Patent Application Public Disclosure No. 52-38244 (1977).

Pneumatic surface followers are frequently used to maintain a predetermined distance between two objects. One or both objects may carry a transducer element to provide an input to a system for effecting measurement and control.

The thickness or caliper of moving sheets is commonly measured by passing the sheet over a roll or fixed plate on one side of the sheet while a surface follower automatically positions itself at a constant distance from the surface of the sheet on the other side. Either the plate or the surface follower or both may contain a proximeter element such as a magnetic reluctance or eddy current sensor element while the other may contain a target element. An unsupported sheet may travel between two surface followers, one of which may contain a proximeter while the other may contain a target element. The proximeter responds to its distance from the target, and the sheet thickness is derived in effect by subtraction of the constant distance or distances of the sheet follower or followers from the sheet surface or surfaces. It has been found, however, that errors arise when there are changes in the roughness of the sheet surface next to the pneumatic surface follower. The measurements have also been subject to substantial, erroneous variations caused by line speed changes, and hence expensive and time-consuming dynamic correlation procedures have been required for calibrating the instruments.

DISCLOSURE OF INVENTION

In accordance with this invention, it has now been found that the sensitivity to changes in the surface roughness is a function of the length of the flow path for high velocity gas over the surface within the gas bearing region. In this region, the surface roughness appears to determine the amount of restriction offered to the high velocity gas flow, and thereby affects the thickness of the gas bearing that keeps the surface follower body separated from the surface.

As a solution to this problem, and to alleviate other difficulties encountered with certain prior art surface follower configurations, the present invention provides apparatus to be utilized in performing a measurement of a traveling sheet or the like, comprising a surface follower body adapted to be constrained during the measurement for movement along a surface follower path intersecting the path of the sheet and urged by a force toward one surface of the sheet, the body having a gas confining wall, the wall having at least an edge portion adapted to be located next to the sheet surface, the edge portion having thereat uniformly distributed pressurized gas supply means with an outer periphery for pressurizing a gas bearing region that is contiguous to the sheet surface and bounded at the sheet surface substantially by the orthographic projection of the periphery on the sheet surface, the pressurization producing sufficient pressure against the sheet and the wall to levitate the body against the urging force, the gas supply means having gas retaining wall means with substantially only knife edge thickness next to the periphery and the sheet surface so as to minimize the area of the sheet surface over which high velocity gas flows in escaping from the gas supply means and the gas bearing region, the body being so shaped that the flow of gas from the gas supply means is substantially unconfined in the region of the sheet surface outside the gas retaining wall means in order to terminate the gas bearing region substantially at the periphery and so that the pressurization is effective without producing substantial amounts of high velocity gas flow over a substantial area of the surface of the sheet within the gas bearing region, whereby the body is maintained at a distance from the sheet surface that is substantially constant and relatively unaffected by variations in the roughness of the surface.

Typically the confining wall comprises an extended central portion, and the gas supply means comprises compressed gas outlet means at the boundary edge of the central portion. The gas outlet means may comprise a continuous aperture, or it may comprise a multiplicity of closely spaced apertures.

The gas outlet means may terminate in a common plane, and the surface follower may have an unconfining wall portion which forms an outer extension of the gas retaining wall means and which adjoins the gas retaining wall means at an angle to the common plane such that the gas bearing region substantially terminates at the outer periphery of the compressed gas outlet means. The angle at which the unconfining wall portion adjoins the confining gas retaining wall means may be such that if a protuberance carried by the traveling sheet strikes a blow on the unconfining wall portion, the force of the blow exerted on the surface follower body will have its major component directed along the surface follower path in the direction which tends to separate the body from the sheet. The confining wall may lie in the common plane, so as to minimize the thickness of the gas bearing region and thereby to minimize the response time of the surface follower body movement.

The confining wall may be imperforate within the central portion. Alternately, the confining wall within the central portion may contain at least one aperture forming a further gas supply means adapted to produce a useful amount of gas flow when the gas bearing region is not substantially pressurized by the compressed gas outlet means at the boundary edge, and to produce an insubstantial amount of high velocity gas flow when the gas bearing region is fully pressurized by the gas outlet means at the boundary edge.

The surface follower body may be arranged to spin around a central axis within the surface follower path and extending substantially at right angles to the plane formed by the gas supply means, thereby to increase the uniformity of the distribution of the pressurized gas supplied thereby.

The gas supply means may be adapted to form, under steady state conditions, a substantially stagnant pocket of gas between the sheet surface and the wall, which pocket is maintained at a gas pressure above ambient pressure.

The gas supply means may have outlet means terminating in a plane, and the gas confining wall may also lie in the plane, so as to minimize the thickness of the stagnant gas pocket and thereby to minimize the response time of the surface follower body movement.

The apparatus may be incorporated in a caliper gauge comprising proximeter target means aboard the surface body, and means including proximeter probe means on the opposite side of the sheet from the surface follower body and responsive to the distance separating the target means from the probe means for producing a response to the thickness of the sheet. The proximeter probe means may be mounted in a reference plate having a reference surface, and means may be provided for maintaining the traveling sheet in contact with the reference surface.

The proximeter probe means may be aboard the second surface follower body. The uniformly distributed gas supply means for the respective two surface follower bodies may be arranged in circles of different diameters. The two surface follower bodies may be arranged to spin in opposite directions and around respective axes at right angles to the planes of the respective circles.

The objects of the invention are to provide apparatus incorporating a pneumatic surface follower body that can maintain a substantially constant distance from a surface that is movable in space, which distance is relatively unaffected by changes in the roughness of the surface; to provide such apparatus which permits a continuous sheet or other object to travel past the surface follower body at a widely variable rate of speed without greatly affecting the constant distance of the surface follower body from the surface of the sheet or other object; and to provide a traveling sheet caliper gauge or similar instrument that may be practically calibrated using static samples and with minimum or no recourse to dynamic correlation procedures.

Further objects and advantages of the invention will become apparent in the following detailed description, taken in conjunction with the accompanying drawings.

MODES FOR CARRYING OUT THE INVENTION

Figures 1, 2, 3:
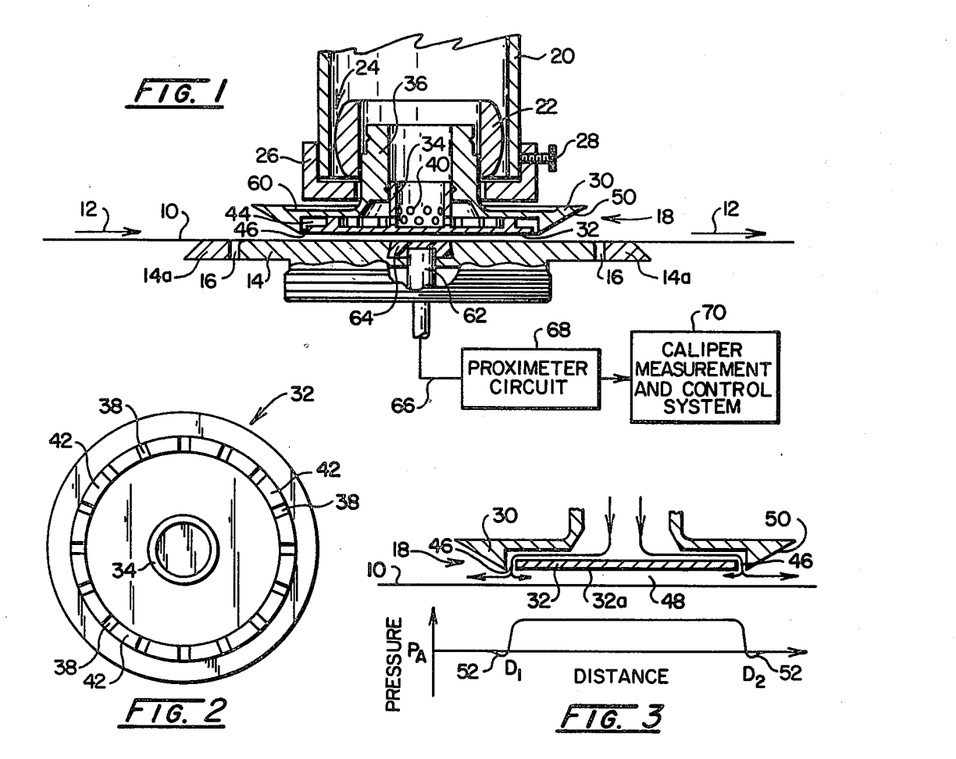
FIG. 1 is an elevational view in section, depicting a caliper gauge, constructed in accordance with this invention, in the process of measuring the thickness of a traveling sheet.
FIG. 2 is a plan view of the target disk member 32 of FIG. 1.
FIG. 3 is a schematic diagram of the surface follower body 18 of FIG. 1 in floating position over the sheet 10, in combination with a graph showing the pressure under the body 18 as a function of distance along its diameter.

Referring to FIG. 1, the numeral 10 designates the edge of a continuous sheet of material such as paper traveling in the direction of the arrows 12. Typically the paper would be traveling from the calender stack to the windup section of a paper making machine (not shown).

For the purpose of measuring and controlling the caliper, or thickness, of the sheet 10, the sheet is measured continuously by a caliper gauge of the general type disclosed in U.S. Pat. No. 3,528,002 to Dunlavey, supra, and more particularly such a gauge using a caliper head similar to that disclosed in U.S. Pat. No. 3,855,524 to Crawford, supra.

In the FIG. 1 embodiment, in a manner similar to that disclosed in the Crawford patent, the sheet 10 passes continuously over a reference plate 14 and is held down against the plate by suction applied through an annular aperture 16 formed between plate 14 and a surrounding extension plate 14a.

If appropriate, the extension 14a may be constructed of a suitable friction-reducing and wear-resistant plastic material, and may extend for a considerable distance beyond the central reference plate portion 14 in one or more directions so as to prevent leverage exerted over the outer edge of the extension 14a by up and down (flutter) movement of the sheet from causing the sheet to buckle slightly in the area over the central reference plate portion 14.

The purpose of the suction, the reference plate and its extension is to constrain the bottom surface of the sheet 10 to a plane whose position is established so that the thickness or caliper of the sheet can be measured in essence by determining the distance of its upper surface from the established plane. This established plane, however, is not fixed in space, since the parts shown are mounted on a traversing mechanism (not shown) similar to that disclosed in the Dunlavey patent, supra, so that the caliper gauging head is movable back and forth across the width of the sheet 10 that should be considered to extend into and out of the paper on which FIG. 1 is printed. Due to the unavoidable mechanical imperfections in the traversing mechanism, the plane established by plate 14 and its extension is subject to some amounts of up and down and tilting movement.

As shown in FIG. 1, floating above the top surface of the sheet 10 is a surface follower body 18. Body 18 is constrained to a surface follower path intersecting the path of the sheet. The surface follower path is established by the bore of a pipe member 20 that cooperates with a gas bearing member 22 on the surface follower body 18.

In operation, the inside of pipe 20 is pressurized with compressed gas (typically compressed air). A continuous flow of the compressed gas escapes to the atmosphere through the clearance gap 24 between the bore of pipe 20 and the gas bearing member 22. The escaping gas forms a lubricating film that centers the gas bearing member 22 in the pipe 20 while allowing substantially frictionless floating movement of the body 18 up and down along the surface follower path established by the bore of pipe 20 and the occasional or continual traversing movement of the pipe across the width of the sheet 10.

When the caliper gauge is not in operation, the pipe 20 is lifted vertically by a conventional lift-off mechanism (not shown) actuated by an electrical solenoid, a fluid-operated piston and cylinder device or the like, and at this time the gas bearing member 22 is retained in the end of the pipe 20 by a stepped collar 26 that slips over the end of the pipe and is secured thereto by screws as at 28 threaded into the collar.

In addition to the gas bearing member 22, the surface follower body 18 includes a floating head member 30 and a target disk member 32. The three members are manufactured separately and then permanently secured together (with collar 26 in place) with epoxy cement so as to form the unitary body 18. The target disk member 32 has a hub 34 that is fitted into the central bore of the floating head member 30 and similarly the floating head member 30 has a hub 36 whose top end is fitted into the central bore of the gas bearing member 22.

The target disk member 32, as also shown in FIG. 2, has a radially slotted land 38 and two rows of holes as at 40 around the base of its hub 34. Thus pressurized gas from pipe 20 can pass through the central bores of gas bearing member 22, floating head member 30 and the disk hub 34, thence passing outwardly through holes 40 and the wide slots as at 42 in the land 38 into an annular gas chamber 44 behind the periphery of disk 32. From chamber 44 the pressurized gas issues through the slot 46 between the outer periphery of disk 32 and the vertical, annular wall of the disk-shaped counterbore in the bottom of the floating head member 30.

In the embodiment shown in FIG. 1, the surface follower body 18 is urged toward the upper surface of the sheet 10, not only by the force produced by the action of gravity on the body (its weight) but also by the force produced by the pressure (above ambient pressure) of the pressurized gas supplied through pipe 20 exerted on the upwardly-facing surface components of the body 18. In particular the downwardly-directed pressure forces generated on the top-facing portion of disk 32 within the outer periphery of the hub 34, and the top-facing surface component of the gas bearing member 22, are not canceled out by upwardly-directed pressure forces produced by the action of the pressurized gas.

As shown schematically in FIG. 3, the body 18 has a gas confining wall portion exemplified by the bottom surface 32a of the disk 32. This wall has at least an edge portion near its perimeter that is adapted to be located next to the sheet surface, the edge portion having thereat uniformly distributed pressurized gas supply means (exemplified by the annular slot 46 between the perimeter of disk 32 and the floating head member 30). The pressurized gas supply means has an outer periphery just beyond the outer edge of the slot 46. The pressurized gas supply means is for pressurizing a gas bearing region 48 that is contiguous to the surface of sheet 10 and bounded at the sheet surface substantially by the orthographic projection of the periphery on the sheet surface. Alternatively (for example) the pressurized gas supply means may comprise a multiplicity of closely spaced holes instead of the continuous annular slot 46.

The gas bearing region 48 is pressurized with sufficient pressure against the sheet 10 and the wall 32a to levitate the body 18 against the urging force (produced by gravity and compressed gas pressure) that urges the body 18 toward the sheet surface.

The gas supply means in FIG. 1 has a gas retaining wall means whose inside surface is formed in part by the vertical annular wall of the disk-shaped counterbore in the bottom of the floating bead member. This gas retaining wall means has substantially only knife edge thickness next to the gas supply means periphery and the sheet surface so as to minimize the area of the sheet surface over which high velocity gas flows in escaping from the gas supply means 46 and the gas bearing region 48. In the FIG. 1 embodiment illustrated, the counterbore may have a diameter of 2.00 inches (5.08 cm), while the gas retaining wall means may have a typical thickness next to the periphery and the sheet surface of only about 0.1–0.2 mm (0.004–0.008 inches).

The graph forming a part of FIG. 3 is a plot of the pressure under body 18 as a function of distance measured along the diameter of a circle that is coaxial with, and adjacent to the plane of, the wall 32a, in which plane the gas outlet means (slot 46) terminates. The gas bearing region 48 extends from $D_1$ to $D_2$, since in this region there is a positive pressure, above ambient pressure $P_A$, that acts to keep the surface follower body 18 above and out of contact with the surface of the sheet 10. Beyond the gas bearing region is a small region 52 where negative gas pressure (with respect to $P_A$) exists due to the fact that the escaping gas has been accelerated and some of its pressure head has been exchanged for velocity head in accordance with Bernoulli's Theorem. It is apparent that the boundary points at $D_1$ and $D_2$ of the gas bearing region 48 are located substantially at the intersections of line $P_A$ with the extensions of orthographic projection lines (vertical lines, not shown)

which project the outer periphery of the pressurized gas supply means 46 onto the surface of the sheet 10.

The gas retaining wall means has an unconfining portion 50 around the perimeter of the floating head member 32. Portion 50 forms an extension of the gas retaining wall means outside the central gas confining wall portion 32a and adjoins the gas retaining wall means at an angle to the common plane of the gas outlet means (slot 46). This angle is such that the gas bearing region 48 substantially terminates at the gas outer periphery of the compressed outlet means since the flow of gas from the gas supply means 46 is substantially unconfined in the region of the sheet surface outside the periphery of the wall portion 32a. The angle (typically 30° as shown) moreover is such that if a high, narrow protuberance carried by the traveling sheet strikes a blow on the unconfining wall portion 50, the force of the blow exerted on the surface follower body 18 will have its major component directed along the surface follower path in the direction which tends to separate the body from the sheet.

The structure exemplified by the schematic drawing of FIG. 3 allows the gas bearing region 48 to be adequately pressurized without producing substantial amounts of high velocity gas flow over a substantial area of the surface of the sheet 10 within the gas bearing region. Under transient conditions, such as when the floating head is first lowered onto the sheet surface, there may be a flow of pressurized gas from the gas supply slot 46 toward the center of the region 48. However, as soon as the space in this region has been filled with the pressurized gas, the pressure in region 48 becomes substantially the same as the pressure in the region of the exit from the slot 46, and thereafter, so long as steady state conditions are maintained, the only flow of gas in the region 48 is that small amount necessary to maintain pressure and keep the pressure equalized over the region. The equalized pressure acts over the entire downwardly-facing surface 32a of the disk 32, which has a larger area than the upwardly-facing surfaces on body 18 that are acted on by the pressurized gas, and hence the body 18 is levitated and maintained at a substantially constant distance from the upper surface of the sheet 10.

The wall 32a formed by the bottom surface of disk 32 lies in a common plane with the terminus of the gas outlet means (the exit from slot 46). This minimizes the thickness of the gas bearing region 48 (shown greatly exaggerated in the drawings) and thereby minimizes the response time of the surface follower body movement.

Figures 4, 5, 6:
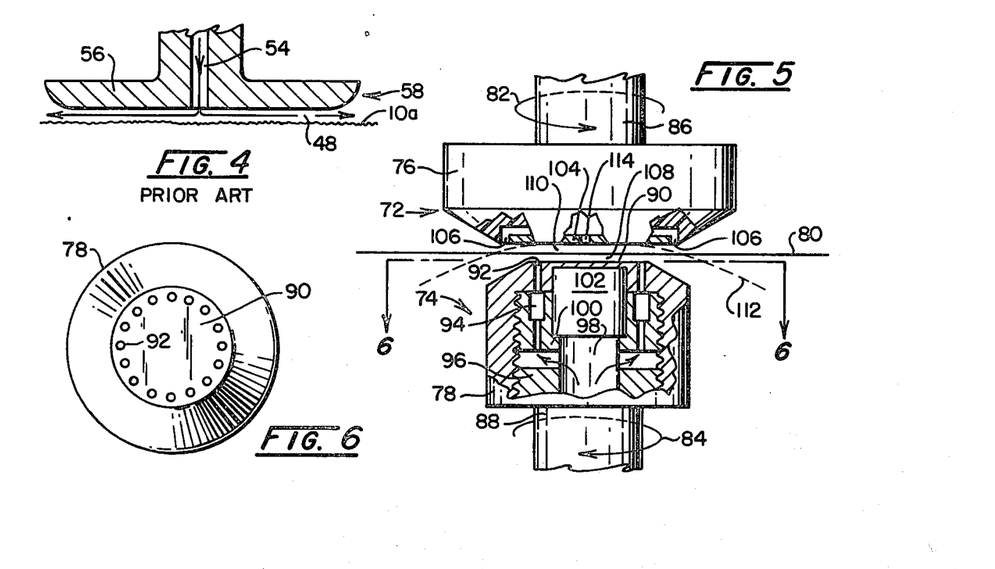
FIG. 4 is a schematic diagram of a portion of one type of prior art surface follower, for comparison with FIG. 3.
FIG. 5 is an elevational view, partially in section, depicting a "dual gas bearing" caliper gauge, constructed in accordance with this invention, in the process of measuring the thickness of a traveling sheet in a noncontacting manner.
FIG. 6 is a section on the line 6—6 of FIG. 5.

For purposes of theoretical discussion, FIG. 4 shows a prior art structure of one type wherein compressed gas is fed in through a central aperture 54 and thence flows outwardly under an extensive flange 56 next to the surface of a sheet 10a of paper and the like that may have a surface of variable roughness. This arrangement is characterized by a very long path for the flow of high velocity gas over the surface of the sheet 10a before the gas passes through the positive and negative-pressure regions and escapes into the ambient pressure region.

It is theorized that in the FIG. 4 structure the high velocity gas interacts with the sheet surface over the entire long path through the positive and negative pressure regions, and that changes in the sheet surface roughness tend to produce changes in the amount of restriction to gas flow along such path. If the roughness of the sheet surface increases, for example, it is theorized that the amount of restriction to the gas flow increases, thus tending to raise the pressure under the surface follower. To compensate, and thereby to keep the pressure at the same value, (that which just overcomes the downwardforce exerted on the body 18) the surface follower body 18 or portion thereof is moved upward, thus increasing the average thickness of the gas film in region 48. Conversely, if the surface roughness decreases, the average thickness of the gas film decreases. Hence a caliper gauge or other instrument that relies on the surface follower to maintain a constant distance from a surface is subject to error when the surface of the object being measured is subject to changes in roughness.

In any case, it has been found that the sensitivity to sheet roughness resulting in changes to air bearing thickness varies as the length of the high velocity air path along the sheet. Accordingly the structure of FIGS. 1–3 is designed to reduce the length of the high velocity air path to as near zero as is practically possible. To this end, the intersection of the slanting, unconfining wall portion 50 with the slot opening 46 (FIGS. 1 and 3) is nearly a knife edge with a typical lateral dimension of only about 0.1–0.2 mm, just enough so that the parts will not be easily damaged by the usual bumps and blows received in normal service. Such damage could upset the essential uniform distribution of pressurized gas around the periphery of the gas bearing region 48. A uniform gas distribution is necessary to produce the substantially stagnant pocket of gas in the gas bearing region 48 between the surface of the sheet 10 and the wall 32a, which pocket is maintained at a gas pressure above ambient pressure $P_A$.

Surface followers according to the present invention have been found to exhibit a marked insensitivity to sheet velocity as well as their insensitivity to sheet roughness. It is theorized that a fast-traveling sheet carries with it a fast-traveling boundary layer of air next to its surface, and the jet of air discharged from a surface follower interacts with the boundary layer. In a prior art arrangement such as that depicted in FIG. 4, the interaction of the jet with the boundary layer may take place substantially inside the region 48, whereas in an arrangement such as that depicted in FIG. 3 the interaction may take place substantially outside the gas bearing region 48, so that the thickness of the gas film supporting the body 48 is relatively unaffected by the sheet velocity changes.

In the past, it has been found necessary to use dynamic correlation techniques to calibrate pneumatic surface follower type caliper gauges for the measurement of paper, because the readings were so dependent on the sheet velocity. These dynamic correlation techniques may require taking readings with the caliper gauge while the paper machine is running at a normal line speed of perhaps 5–10 meters per second and at the same time cutting out of the sheet the narrow strip of paper that actually passed under the surface follower while the readings were taken, for example, using methods and apparatus such as those described in the Fleming et al U.S. Pat. Nos. 3,640,162 and 3,769,829. Subsequently micrometer measurements have to be taken along the whole lengths of the cut-out strips and the caliper gauge readings corrected accordingly, if necessary, to achieve the proper calibration at that line speed. A caliper gauge having substantial insensitivity to sheet velocity, however, can be calibrated with a set of static samples whose micrometer thicknesses are known, and the requirement for dynamic correlation can be either eliminated or reduced to perhaps one or two abbreviated checks.

In an embodiment according to FIG. 1 that has been constructed, the disk 32 was 1.98 inches (5.03 cm) in diameter, whereas the counterbore in the head 30 was 2.00 inches (5.08 cm), thus leaving a width for the slot 46 of 0.01 inches (0.025 cm). To make the mass of the surface follower relatively low, the head 30 and the gas bearing 22 were made of plastic, specifically that marketed under the trademark Delrin. The top flange of the head was dished out at 60 to further reduce mass. The disk 32 formed the target for an eddy current proximeter probe 62, and hence the disk 32 was made of stainless steel, which has appropriate electrical conductivity and corrosion resistance and is not too easily scratched.

The probe 62 is imbedded in epoxy compound 64 filing a tapered, undercut counterbore in the reference plate 14. The probe is electrically connected by wires 66 to a conventional proximeter circuit 68 so as to obtain a signal that can be supplied to a conventional caliper measurement and control system 70. System 70 converts the proximeter output, and hence the distance of the target disk 32 above probe 62, to a measurement of the thickness of the sheet 10. The measured thickness is indicated, recorded and/or used to control the sheet caliper, as desired, in a manner that is generally described in an article by Van Munn, P. H., "On Line Caliper Measurement and Control," in TAPPI, Vol. 53, No. 5, May 1970, pp 825–829.

Many sheet materials such as certain papers are often highly abrasive and may quickly destroy the plate 14. Materials may also be sticky, or contain gummy substances that will cause rapid buildup of deposits on the plate. Hence it is frequently necessary or desired to provide a caliper gauge that is essentially noncontacting, and to this end one may use a so-called "dual gas bearing" arrangement such as that shown in FIGS. 5 and 6 having a "top" surface follower body 72 and a "bottom" surface follower body 74. The body 72 includes a floating head member 76 and the body 74 has a floating head member 78.

The surface follower bodies 72 and 74 are adapted to be constrained during measurement for movement along a mutual surface follower path intersecting the path of the sheet 80 substantially at right angles. With certain modifications to be noted, involving in particular the structure of the floating head members 76 and 78, each of the surface followers may be constructed in a manner similar to that shown in U.S. Pat. No. 3,321,838 to Albertson, supra, FIGS. 16 and 17. Each surface follower body as at 72 and 74 is suspended during operation in gas bearings associated with a cylinder and multiple-piston arrangement (not shown herein) that constrains the body to the surface follower path. Each body is urged toward a respective surface of the sheet 80 by a force produced by compressed gas pressure applied to one of the pistons. The compressed gas input to supply the floating heads, as shown most particularly in Albertson's FIG. 17, is modified so as to cause the gas input stream to impinge directly and nearly tangentially on the central hollow stem, causing the surface follower bodies to rotate at high speed around the axis of the surface followers. The rotation of the bodies is in opposite directions, as suggested herein by the arrows 82 and 84 circumscribed around the respective stems 86 and 88. From all indications, it now appears that the performance of all caliper instruments according to the present invention is improved, at least slightly, if the floating heads are arranged to spin. Since the structure not shown herein forms no part of the presently claimed invention, it is believed that the foregoing brief explanation is sufficient.

The bottom floating head 78 of surface follower body 74 has a gas confining wall 90, the wall having at least an edge portion adapted to be located next to the bottom sheet surface, the edge portion having thereat uniformly distributed pressurized gas supply means comprising a multiplicity of small drilled holes as at 92 in the head 78. This pressurized gas supply means has an outer periphery just beyond the outer rims of the holes 92. Each of the holes 92 has a gas retaining wall with substantially only knife edge thickness next to the periphery and the sheet surface so as to minimize the area of the sheet over which high velocity gas flows in escaping from the gas supply means and the air bearing region. The holes 92 are supplied with compressed gas through passages as at 94 in the spool-end 96 of stem 88, that has a central bore 98. The spool-end 96 of stem 88 is externally threaded to screw into the head 78, and has a collar-portion 100 to retain a proximeter probe 102.

The probe 102 cooperates with a target disk 104 that may be constructed in a manner similar to that described for target disk 32, FIGS. 1-3. The bottom of disk 104 forms a gas confining wall bounded by uniformly distributed gas supply means 106 that may comprise either a continuous slit or a multiplicity of holes similar to the FIG. 6 arrangement.

The structures of FIG. 5 and their appurtenances are guided by, or carried on, sheet traversing mechanisms (not shown) on opposite sides of the path of the sheet 80 in a manner similar to that described in U.S. Pat. No. 3,528,002 to Dunlavey, supra. These mechanisms may have allowable mechanical imperfections, or tolerances, that permit the traversing structures to deviate, with at least five degrees of freedom, from their ideal courses, and the allowable deviations generally considerably exceed the accuracy tolerances for a caliper gauge, for example. Hence while the surface follower bodies 72 and 74 nominally spin around a common axis, as a matter of fact there may be a considerable deviation of the axis, or surface follower path for one body from the axis or path of the other body. The amount and direction of the misalignment, may, moreover, be continually or continuously changing, at least while the structures are being traversed across the width of the sheet.

To minimize the errors that result from the constantly changing misalignment, the gas supply means 92 and 106 are distributed around circles of different diameters. Hence the entire smaller gas bearing region 108 that is pressurized by gas supply means 92 is always opposite some region within the larger gas bearing region 110, on the other side of the sheet, that is pressurized by gas supply means 106, despite the fact that the centroids of the two gas bearing regions 108 and 110 may be out of register by differing amounts and in different directions at various times.

With a dual gas bearing construction such as that shown in FIG. 5 and described above, if the sheet 80 is not present and if the compressed gas delivered through the hollow stem passage 98 is cut off, the compressed gas supplied through opening(s) 106 cannot maintain a gas bearing region between the surface follower bodies, and direct, solid contact between them could occur. It is desired to avoid such direct contact under these conditions. Moreover, there is a high probability that, during measurement, excessive sheet flutter could cause the sheet 80 to bend into an arcuate path, shown in exaggerated fashion by the dashed line 112, so that the sheet could become too widely separated from the pressurized gas supply openings 106 and make direct contact with the surface of disk 104. This occurrence could cause a loss of the gas bearing film, in region 110, that could not be reestablished, because the pressurized gas flow into at least part of the region could be cut off by the contact of the sheet as shown at 112 with the disk 104. For these reasons, inter alia, the disk 104 is not made to form an imperforate wall within the boundaries defined by the pressurized gas supply means 106, as in the structure of FIG. 3 which has the imperforate wall 32a.

Instead, the disk 104 is made with a central aperture 114 that may be connected to the same compressed gas delivery system as that which feeds the gas supply openings 106. When there is no sheet 80 between bodies 72 and 74 and the gas supply to openings 92 is cut off, aperture 114 injects a useful amount of compressed gas flow sufficient to maintain a gas film of minimum thickness between the bodies. If the normal gas bearing in region 110 is "lost" for some reason such as excessive flutter of the sheet into an arc as at 112, the aperture 114 is there to effect an initial repressurization and allow the gas supply means 106 thereafter to resume its normal task.

It might appear on first impression that the presence of one or more pressurized gas supply apertures as at 114 within the boundary of the gas bearing region 110 might cause the surface roughness-independence of the caliper measuring apparatus to greatly deteriorate by producing substantial amounts of high velocity gas flow over the sheet within region 110. However, with reference to the graph of FIG. 3, the pressurized gas supply means 46 or 106 (FIG. 5) are per se designed to pressurize the entire gas bearing regions 48 and 110 with a pressure that is substantially above ambient pressure. For example, the FIG. 1 embodiment as shown and described has been operated very satisfactorily with a gas pressure (above ambient) of about forty-six inches (117 cm) of water in pipe 20, which pressurizes the gas bearing region 48 quite uniformly at about twenty-two inches (56 cm) of water (above $P_A$). Hence there is a substantially reduced pressure differential across the central aperture 114 when the gas bearing region is fully pressurized, so that considering the relative size of the central aperture 114, there is an insubstantial amount of high velocity gas flow produced thereby when the gas bearing region is fully pressurized. However, the aperture 114 can deliver a useful amount of gas flow when the gas bearing region is not substantially pressurized by the gas outlet means 46 or 106 at the boundary edge.

Figures 7, 8:
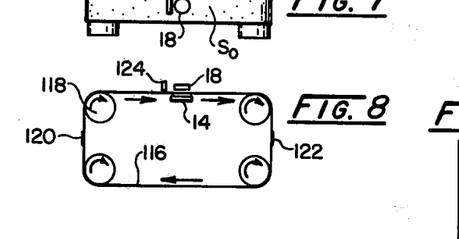
FIG. 7 is a plan view sketch of a laboratory apparatus for testing a caliper gauge according to the invention.
FIG. 8 is an elevational view sketch of the apparatus of FIG. 7.

FIGS. 7 and 8 show a laboratory set-up for testing caliper gauge apparatus and the like such as that shown in FIG. 1. A "standard" magazine paper 116 was formed into an endless loop about fifteen feet (4½ meters) long passing around rolls as at 118. The loop had two splices at 120 and 122 so that half of the length of paper had the (Fourdrinier) wire side "up" while the other half had the (press) felt side "up". The paper used had a so-called "printing smoothness" differential of about one micron between the two surfaces. The loop 116 of paper could be driven by the one roll 118 at an adjustable, measured speed. The position of the floating head for one test is represented at 18, with the reference plate shown at 14, as in FIG. 1. The measurements were recorded on a continuous, strip chart recorder (not shown). The splice areas 120 and 122 were blackened with black paint, and a photoelectric detector 124 was used in an electronic gating circuit arranged so that very little or none of the caliper gauge upset caused by the splices was allowed to appear on the recorder traces.

Figure 9:
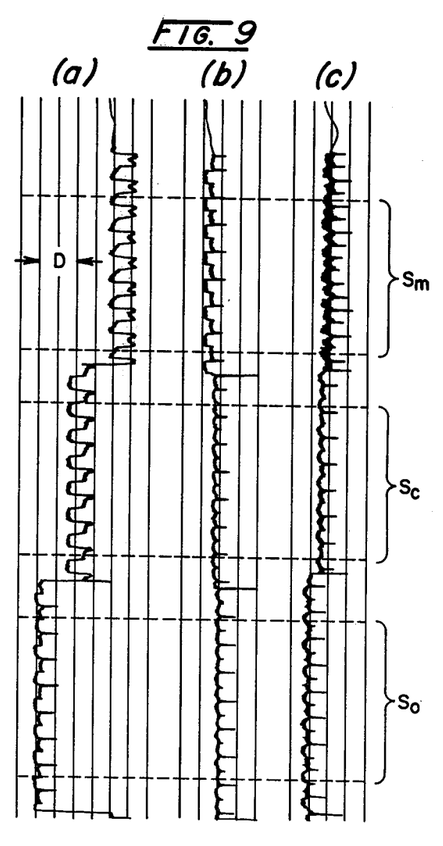
FIG. 9 shows representations at (a), (b) and (c) of recorder traces comparing the performance of three caliper gauge heads in tests conducted using the apparatus of FIGS. 7 and 8.
Figure 10:
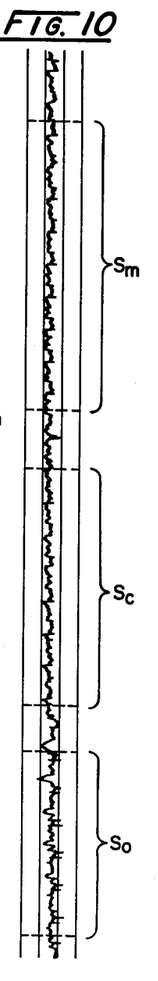
FIGS. 10 and 11 show representations of recorder traces illustrating respectively the degrees of surface insensitivity and speed insensitivity obtained from a caliper gauge in accordance with FIG. 1.
Figure 11:
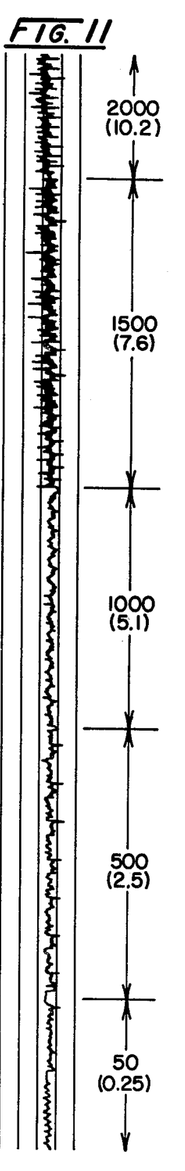

FIGS. 9–11 show a draftsman's reproduction of recorder traces. Here the dimension D (two major chart divisions) represents a change in indicated paper thickness of one mil (25 microns) and a voltage change of one hundred millivolts. The time constant is one hundred milliseconds.

As shown in FIG. 7, the loop of paper 116 was marked off in three zones $S_O$, $S_C$ and $S_M$. Zone $S_O$ had the original calendered surface. Zone $S_C$ had its surface roughened and partially ground away by sanding it with 320 grit crocus cloth while the machine of FIGS. 7 and 8 was running. Likewise zone $S_M$ had its surface more severely roughened and partially ground away by "sanding" it with a sheet of plastic mesh or screen.

FIG. 9(a) shows recordings made with a commercial caliper gauge head (interchangeable with the head 18 of FIG. 1) on the paper in zones $S_O$, $S_C$ and $S_M$. Time progresses up from the bottom of the charts. The paper 116 was traveling at about one hundred feet (thirty meters) per minute. The pressure in the pipe 20 was set at thirty inches (76 cm) of water, which suits the commercial gauge.

As shown by FIG. 9(a), the commercial gauge head indicated that the paper thickness in zone $S_C$ was about one mil (25 microns) greater than it was in zone $S_O$, and more than two mils greater in zone $S_M$.

The same paper was then measured with the head of FIG. 1 as above described, under substantially the same conditions. The pressure regulator setting was not changed, but since the air conduit connecting the regulator to the head had some restriction and since the FIG. 1 head uses less air than the commercial head, the pressure in pipe 20 may have increased to forty inches (100 cm) or so. As shown in FIG. 9(b) the gauge head of the invention indicated that the paper thickness in zone $S_C$ was about 0.1 mil (2.5 microns) less than in zone $S_O$, and about 0.3 mil (7.5 microns) less in zone $S_M$. This result is logical since it was plain to see that some paper had been removed during the sanding processes, because of the paper dust formed. The result of FIG. 9(a), on the contrary, is illogical, and evidently must be accounted for by the roughness effect.

An attempt was made to achieve an extreme roughness sensitivity comparison by sealing the slot 46 of a head as in FIG. 1 and as described above, and then drilling a center hole as at 54 in FIG. 4 to form an outlet area the same as the area of the sealed slot 46. The head so modified, however, would not levitate. This result is not surprising by hindsight, since the structure closely resembles the familiar spool and cardboard disk toy that demonstrates the "pneumatic paradox" as discussed in the Allen U.S. Pat. No. 1,946,924 supra.

To make the modified head levitate, the experimenters cut a circular piece of pressure-sensitive paper tape slightly less than two inches (5.08 cm) in diameter with a smaller circular piece 1⅜ inches (4⅛ cm) in diameter concentrically removed from its center. The annular piece of tape was then stuck to the bottom of the disk 32, where it formed a land about 3/16 inch (0.48 cm) wide and 0.007 inch (0.18 mm) thick just inside the sealed slot 46. FIG. 9(c) shows the results obtained when the head so modified was used to make the same measurements as in FIGS. 9(a) and 9(b). The paper in zone $S_C$ is indicated to be about 0.35 mil (9 microns) thicker than that in zone $S_O$, and the paper in zone $S_M$ is indicated to be about 0.45 mil (11 microns) thicker than zone $S_O$.

This experiment confirms other experiments showing that the roughness effect is directly dependent on the width of the land that was formed by the tape. The effective width of the land in the case of the commercial caliper head used to obtain the recording of FIG. 9(a) was about ⅝ to ¾ inches (1.6 to 1.9 cm).

For the comparison tests of FIG. 9, the caliper head of FIG. 1 was operated with a lower pressure in pipe 20 than that which gave the best performance. In particular, it was found that the sensitivity to changes in sheet velocity was much greater than desired. For other tests whose results are illustrated in FIGS. 10 and 11, the pressure was increased to forty-six inches (117 cm) of water in pipe 20. The paper loop 116 used in the FIG. 10 test was not the same as that used in the FIG. 9 tests, but was prepared in the same manner. The recorder traces in FIG. 10 indicate logically that the paper areas with the crocus cloth and plastic mesh-sanded surfaces in zones $S_C$ and $S_M$ are thinner than the paper with the original surface in zone $S_O$.

FIG. 11 shows recordings from a sheet speed sensitivity test using the head of FIG. 1 operated at the forty-six inch (117 cm) pressure. The marginal numbers 50, 500, 1000, 1500 and 2000 indicate the sheet velocity in feet per minute, whereas the numbers in parentheses indicate the velocity in meters per second. There is no apparent thickness change indication at sheet speeds up to 1000 feet per minute. At 1500 feet per minute the indicated thickness is apparently decreased by about 0.05 mils (1.3 microns) and at 2000 feet per minute it is apparently decreased by about 0.15 mils (4 microns). It is believed that the performance can be further improved by optimizing parameters such as the slot 46 width and gas pressure.

One test was performed on a commercial paper making machine where previously commercial caliper gauges have consistently indicated the paper sheet to be thicker on the edges than it was in the center, whereas in fact a great many micrometer readings have shown that the sheet edges generally were not thicker in fact. From visual and other tests it appeared that the real difference between the sheet edges and the center was a difference in the roughness of the sheet, due to differences in the way the center and the edges were dried on the machine. When a caliper head constructed in accordance with FIG. 1 was used, the erroneously indicated difference between the sheet edges and the center disappeared.

While the invention has been described and illustrated as particular apparatus, the showing and description are clearly illustrative only and not restrictive, since obviously many changes, modifications and outwardly different embodiments can be made without departing from the spirit and scope of the invention.

What is claimed is:

1. Apparatus to be utilized in performing a measurement of a traveling sheet or the like, comprising
    a surface follower body adapted to be constrained during the measurement for movement along a surface follower path intersecting the path of the sheet and urged by a force toward one surface of the sheet,
    the body having a gas confining wall, the wall having at least an edge portion adapted to be located next to the sheet surface, the edge portion having thereat uniformly distributed pressurized gas supply means with an outer periphery for pressurizing a gas bearing region that is contiguous to the sheet surface and bounded at the sheet surface substantially by the orthographic projection of the periphery on the sheet suface,
    the pressurization producing sufficient pressure against the sheet and the wall to levitate the body against the urging force,
    the gas supply means having gas retaining wall means with substantially only knife edge thickness next to the periphery and the sheet surface so as to minimize the area of the sheet surface over which high velocity gas flows in escaping from the gas supply means and the gas bearing region,
    the body being so shaped that the flow of gas from the gas supply means is substantially unconfined in the region of the sheet surface outside the gas retaining wall means in order to terminate the gas bearing region substantially at the periphery and so that the pressurization is effective without producing substantial amounts of high velocity gas flow over a substantial area of the surface of the sheet within the gas bearing region, whereby the body is maintained at a distance from the sheet surface that is substantially constant and relatively unaffected by variations in the roughness of the surface.

2. Apparatus as in claim 1 wherein the confining wall comprises an extended central portion, and
    wherein the gas supply means comprises compressed gas outlet means at the boundary edge of the central portion.

3. Apparatus as in claim 2 wherein the gas outlet means comprises a continuous aperture about the boundary edge of the central portion.

4. Apparatus as in claim 2 wherein the gas outlet means comprises a multiplicity of closely spaced apertures about the boundary edge of the central portion.

5. Apparatus as in claim 2 wherein the gas outlet means terminates in a common plane, comprising an unconfining wall portion which forms an outer extension of the gas retaining wall means and which adjoins the gas retaining wall means at an angle to the common plane such that the gas bearing region substantially terminates at the outer periphery of the compressed gas outlet means.

6. Apparatus as in claim 5 wherein the angle at which the unconfining wall adjoins the gas retaining wall means is such that if a protuberance carried by the traveling sheet strikes a blow on the unconfining wall portion, the force of the blow exerted on the surface follower body will have a major component directed along the surface follower path in the direction which tends to separate the body from the sheet.

7. Apparatus as in claim 5 wherein the confining wall lies in the common plane, so as to minimize the thickness of the gas bearing region and thereby to minimize the response time of the surface follower body movement.

8. Apparatus as in claim 2 wherein the confining wall is imperforate within the central portion.

9. Apparatus as in claim 2 wherein the confining wall within the central portion contains at least one aperture forming a further gas supply means adapted to produce a useful amount of gas flow when the gas bearing region is not substantially pressurized by the compressed gas outlet means at the boundary edge, and to produce an insubstantial amount of high velocity gas flow when the gas bearing region is fully pressurized by the gas outlet means at the boundary edge.

10. Apparatus as in claim 2 wherein the gas outlet means terminates in a common plane, and wherein the surface follower body is arranged to spin around a central axis within the surface follower path and extending substantially at right angles to the plane formed by the gas supply means, thereby to increase the uniformity of the distribution of the pressurized gas supplied thereby.

11. Apparatus as in claim 10 wherein the gas supply means comprises an array of closely spaced apertures.

12. Apparatus as in claim 1 wherein the gas supply means comprises a continuous aperture about said edge portion of said gas confining wall.

13. Apparatus as in claim 1 wherein the gas supply means comprises an array of closely spaced apertures about said edge portion of said gas confining wall.

14. Apparatus as in claim 1 wherein the gas supply means is adapted to form, under steady state conditions, a substantially stagnant pocket of gas between the sheet surface and the gas confining wall, which pocket is maintained at a gas pressure above ambient pressure.

15. Apparatus as in claim 14 wherein the gas supply means has outlet means terminating in a plane, and the gas confining wall also lies in the plane, so as to minimize the thickness of the stagnant gas pocket and thereby to minimize the response time of the surface follower body movement.

16. Apparatus as in claim 1 comprising a caliper gauge having proximeter target means aboard the surface follower body, and
    means including proximeter probe means on the opposite side of the sheet from the surface follower body and responsive to the distance separating the target means from the probe means for producing a response to the thickness of the sheet.

17. Apparatus as in claim 16 wherein the proximeter probe means is mounted in a reference plate having a reference surface, comprising means for maintaining the traveling sheet in contact with the reference surface.

18. Apparatus as in claim 16 wherein the proximeter probe means is aboard a second surface follower body.

19. Apparatus as in claim 18 wherein the uniformly distributed gas supply means for the respective two surface follower bodies are arranged in circles of different diameters.

20. Apparatus as in claim 19 wherein the two surface follower bodies are arranged to spin in opposite directions around respective axes at right angles to the planes of the respective circles.

* * * * *